(12) United States Patent
Ozaki et al.

(10) Patent No.: US 10,303,985 B2
(45) Date of Patent: May 28, 2019

(54) CLASS ESTIMATION APPARATUS, NON-TRANSITORY COMPUTER READABLE MEDIUM, AND CLASS ESTIMATION METHOD

(71) Applicant: FUJI XEROX CO., LTD., Tokyo (JP)

(72) Inventors: Ryota Ozaki, Yokohama (JP); Yukihiro Tsuboshita, Yokohama (JP); Noriji Kato, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 8 days.

(21) Appl. No.: 15/292,528

(22) Filed: Oct. 13, 2016

(65) Prior Publication Data

US 2017/0337450 A1 Nov. 23, 2017

(30) Foreign Application Priority Data

May 20, 2016 (JP) .................................. 2016-101232

(51) Int. Cl.
*G06K 9/62* (2006.01)

(52) U.S. Cl.
CPC ......... *G06K 9/6282* (2013.01); *G06K 9/6227* (2013.01); *G06K 9/6277* (2013.01)

(58) Field of Classification Search
CPC ... G06K 9/6282; G06K 9/6227; G06K 9/6277
See application file for complete search history.

(56) References Cited

U.S. PATENT DOCUMENTS

| | | | | | |
|---|---|---|---|---|---|
| 6,009,199 | A | * | 12/1999 | Ho | G06K 9/6282 382/224 |
| 6,058,205 | A | * | 5/2000 | Bahl | G06K 9/6282 382/159 |
| 6,353,814 | B1 | * | 3/2002 | Weng | G05B 13/0265 700/258 |
| 6,519,580 | B1 | * | 2/2003 | Johnson | G06F 17/3061 706/16 |
| 6,532,305 | B1 | * | 3/2003 | Hammen | G06K 9/6282 382/159 |
| 6,718,315 | B1 | * | 4/2004 | Meek | G06N 99/005 706/12 |
| 7,464,068 | B2 | * | 12/2008 | Fan | G06F 17/30017 |
| 7,634,140 | B2 | * | 12/2009 | Okajima | G06K 9/623 382/159 |
| 7,941,462 | B2 | * | 5/2011 | Akinyemi | G06K 9/469 707/803 |

(Continued)

FOREIGN PATENT DOCUMENTS

JP 2012-042990 A 3/2012

OTHER PUBLICATIONS

Ristin, Marko et al., "Incremental Learning of NCM Forests for Large-Scale Image Classification," Computer Vision Foundaton, pp. 1-8.

*Primary Examiner* — Brenda C Bernardi
(74) *Attorney, Agent, or Firm* — Oliff PLC (57) ABSTRACT

There is provided a class estimation apparatus. A data reception unit receives an input of a feature amount of data. An identification device reception unit receives an input of an identification device having a tree structure. A table storage unit stores a probability table and a feature amount table in a leaf node of the tree structure. A probability table correction unit corrects the probability table. A class estimation unit estimates a class of the data.

4 Claims, 6 Drawing Sheets

(56) References Cited

U.S. PATENT DOCUMENTS

| | | | | | |
|---|---|---|---|---|---|
| 8,712,931 | B1* | 4/2014 | Wahlen | | G06F 3/0237 |
| | | | | | 706/12 |
| 8,744,172 | B2* | 6/2014 | Tsymbal | | G06K 9/6263 |
| | | | | | 382/159 |
| 8,755,611 | B2* | 6/2014 | Tate | | G06K 9/6282 |
| | | | | | 382/218 |
| 8,819,016 | B2* | 8/2014 | Nakagawa | | G06T 17/005 |
| | | | | | 345/440 |
| 8,860,715 | B2* | 10/2014 | Birkbeck | | G06K 9/00986 |
| | | | | | 345/419 |
| 8,953,888 | B2* | 2/2015 | Kohli | | G06K 9/6211 |
| | | | | | 382/190 |
| 9,077,958 | B2* | 7/2015 | Gupta | | G06K 9/00798 |
| 9,218,524 | B2* | 12/2015 | Wang | | G06K 9/00362 |
| 9,805,248 | B2* | 10/2017 | Brieu | | G06K 9/0014 |
| 9,805,256 | B2* | 10/2017 | Alcoverro Vidal | | |
| | | | | | G06K 9/00355 |
| 2011/0110581 | A1* | 5/2011 | Yang | | G06K 9/00201 |
| | | | | | 382/154 |
| 2012/0039541 | A1* | 2/2012 | Fukui | | G06K 9/6282 |
| | | | | | 382/224 |
| 2012/0072469 | A1* | 3/2012 | Perez | | G06Q 30/0201 |
| | | | | | 707/810 |
| 2013/0343619 | A1* | 12/2013 | Criminisi | | G06K 9/6219 |
| | | | | | 382/128 |
| 2014/0307956 | A1* | 10/2014 | Criminisi | | G06K 9/627 |
| | | | | | 382/159 |
| 2015/0073753 | A1* | 3/2015 | Rameau | | G06T 17/10 |
| | | | | | 703/1 |
| 2015/0110349 | A1* | 4/2015 | Feng | | G06K 9/00234 |
| | | | | | 382/103 |
| 2015/0125072 | A1* | 5/2015 | Mitarai | | G06K 9/6217 |
| | | | | | 382/155 |
| 2015/0213373 | A1* | 7/2015 | Li | | G06N 7/005 |
| | | | | | 706/52 |
| 2015/0262416 | A1* | 9/2015 | Hecht | | G06T 17/005 |
| | | | | | 345/424 |
| 2015/0281389 | A1* | 10/2015 | Firsov | | G06F 17/30589 |
| | | | | | 709/214 |
| 2016/0180157 | A1* | 6/2016 | Alcoverro Vidal | | |
| | | | | | G06K 9/00201 |
| | | | | | 382/103 |
| 2017/0061254 | A1* | 3/2017 | Burgos | | G06K 9/3241 |
| 2017/0083920 | A1* | 3/2017 | Zoldi | | G06N 99/005 |

* cited by examiner

—Prior Art—

FIG. 5

CLASS ESTIMATION APPARATUS, NON-TRANSITORY COMPUTER READABLE MEDIUM, AND CLASS ESTIMATION METHOD

CROSS-REFERENCE TO RELATED APPLICATIONS

This application is based on and claims priority under 35 U.S.C. § 119 from Japanese Patent Application No. 2016-101232 filed on May 20, 2016.

TECHNICAL FIELD

The present invention relates to a class estimation apparatus, a non-transitory computer readable medium, and a class estimation method.

SUMMARY

According to an aspect of the embodiments of the present invention, there is provided a class estimation apparatus including a data reception unit that receives an input of a feature amount of data, an identification device reception unit that receives an input of an identification device having a tree structure, a table storage unit that stores a probability table and a feature amount table in a leaf node of the tree structure, a probability table correction unit that corrects the probability table, and a class estimation unit that estimates a class of the data.

BRIEF DESCRIPTION OF THE DRAWINGS

Exemplary embodiments of the present invention will be described in detailed based on the following figures, wherein.

DETAILED DESCRIPTION

Hereinafter, an exemplary embodiment for realizing the invention will be described in detail. However, the exemplary embodiment to be described hereinafter indicates an example of a class estimation apparatus for embodying a technical concept of the present invention, but the invention is not intended to limit the exemplary embodiment, and the invention is equally applied to exemplary embodiments which are variously modified without departing from a technical concept disclosed in claims.

The class estimation apparatus according to the exemplary embodiment is provided with a data receiving unit to which a feature amount of data is input, an identification device reception unit to which the identification device having a tree structure is input, a table storage unit which stores a probability table and a feature amount table in a leaf node of the tree structure, a probability table correction unit which corrects the probability table, and a class estimation unit which outputs a result a belonging class of data of which the belonging class is unknown is estimated. In some exemplary embodiments, a classifier is employed as a specific example of the identification device.

Figure 1:
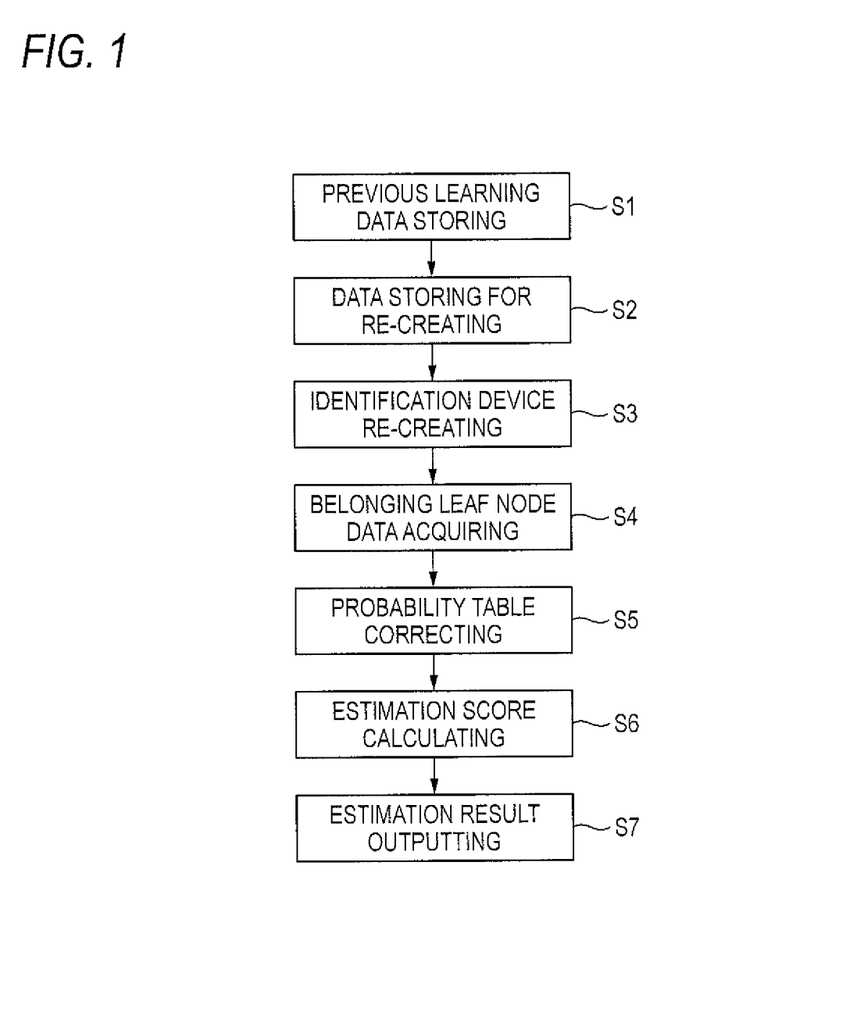
FIG. 1 is a conceptual diagram illustrating a basic configuration of a process in a class estimation apparatus according to an exemplary embodiment.
Figure 2:
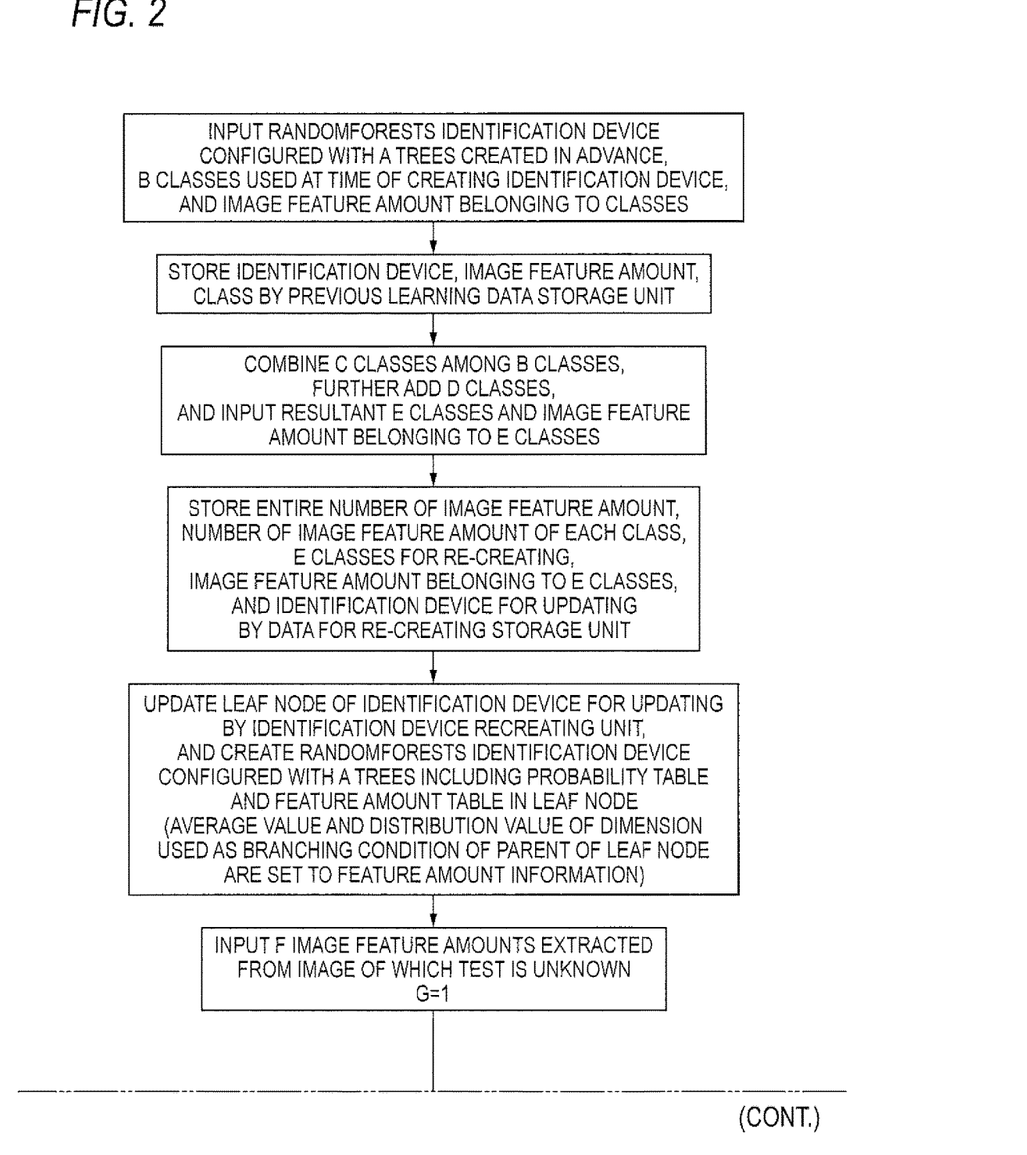
FIG. 2 is a flow chart illustrating an example of the process in the class estimation apparatus according to the exemplary embodiment.

A flow of a process of the exemplary embodiment will be described with reference to FIG. 1 and FIG. 2. FIG. 1 illustrates a flow of a basic process in the class estimation apparatus according to the exemplary embodiment, and FIG. 2 illustrates an example of a more detailed process in a case of using image data as a learning data.

[Previous Learning Data Storing Step]

In a previous learning data storing step S1, a tree structure identification device created in advance is input to the identification device reception unit, and the learning data at the time of creating the tree structure identification device and classes belong to each data item are input to the data receiving unit. These are stored as the previous learning data.

As the learning data, any types of data may be used, but M-dimensional vector data is used. For example, if there is the image data, feature amounts of colors, edge information, and the like extracted from each image are set to as the learning data, and a label assigned to each image in advance is set to a class to which the learning data is belong. At this time, plural feature amounts may be extracted from one image. Here, the feature amounts may be extracted using a feature extractor, which is created by performing learning from large amount images in advance using DeepLearning method.

Also, if there is sound data, feature amounts of frequency component information of phoneme, and the like extracted from each sound are set to learning data, and a label (spoken person, word, or the like) assigned to each sound in advance is set to a class to which the learning data is belong.

In addition, if there is text data, feature amounts of making a word as vector, and the like extracted from each text are set to learning data, and a label (types of documents, polarity, or the like) assigned to each text in advance is set to a class to which the learning data is belong.

The tree structure identification device stored inside the previous learning data is configured with a root node, an internal node, and the leaf node, is an identification device in which the root node and the internal node become a branching condition, and the leaf node has a probability table (a pair of class belong to leaf node and number of data items), and as the device, there is a device made of one decision tree, RandomForest, AdaBoost, GradientBoostingDecisionTrees, and the like. In addition, regarding the branching conditions, in a case of the RandomForest, dimensions and threshold values of vectors selected for each internal nodes are determined on the basis of an entropy and a Gini coefficient during learning, in a case in which the value is the threshold value or lower, the tree structure identification device traces to a right node, and, in a case in which the value is larger than the threshold value, the tree structure identification device traces to a left node. Also, the feature amount table to be described later may be further included in the leaf node.

[Data for Recreating Storing Step]

In a data for recreating storing step S2, previous learning data stored in the previous learning data storing step, and data for recreation, in which the learning data of performing addition and modification and the class belong to each data item, are input to the data receiving unit are stored.

As the data for recreation, there are the entire number of the learning data items, the number of learning data items of each class, the learning data for recreation and the class thereof, an identification device for updating, and the like. As the learning data for recreation, the entire learning data may be a target, and in a case in which the class or data is added, and a case in which the identification device inside the previous learning data is an identification device including the probability table and the feature amount table, only learning data to be added may be a target.

In the identification device for updating, in a case in which the entire data is used at the time of updating with respect to the tree structure identification device created in advance inside the previous learning data, the probability table is reset. In addition, in a case in which the class or data is added, and a case in which the identification device inside the previous learning data is an identification device including the probability table and the feature amount table, the probability table or the feature amount table may be held as it is.

In a case in which the identification device is Random-Forest, or the like, the learning data for recreation may perform random sampling, and in a case in which the tree structure identification device created in advance is multiple, the learning data used for recreating until the same numbers and the identification device for updating can be created.

[Identification Device Recreating Step]

In an identification device recreating step S3, after the data for recreation is input, the leaf node of the identification device for updating is updated using the learning data for recreation and the class belong to each data item, and when the probability table and the feature amount table are held in the leaf node by a table storage unit, the tree structure identification device after being updated in which the probability table and the feature amount table are included in the leaf node is recreated.

The feature amount table becomes a pair of the class belong to the leaf node and feature amount information. For example, the feature amount information is an average value, a variance value, an intermediate value, a standard deviation value, a minimum value, a maximum value, and the like in each class of the leaf node belong to the learning data. In addition, only a dimension of a part of the learning data is used, such as only a dimension being used as a branching condition of a parent of the leaf node, from the root node to the leaf node, only a dimension being used to the branching condition of the internal node, and only a dimension selected randomly, an average value, a variance value, a intermediate value, a standard deviation value, a minimum value, a maximum value, and the like in each class are calculated, and these may become the feature amount information. Also, since the probability table and the feature amount table are the same number, these tables may be summarized as one table. Table 1 is an example of a normal probability table, and illustrates an example in which the feature amount tables are summarized as one with respect to the probability table in Table 2.

TABLE 1

| Class Name | Number of Data |
|---|---|
| Class 1 | 8 |
| Class 2 | 3 |

TABLE 2

| Class Name | Number of Data | Average Value | Variance Value |
|---|---|---|---|
| Class 1 | 8 | 0.5 | 0.05 |
| Class 2 | 3 | 0.2 | 0.01 |

[Belonging Leaf Node Data Acquiring Step]

In a belonging leaf node data acquiring step S4, data which is a target of class estimation and for which a belonging class is unknown, and the updated tree structure identification device are input, a leaf node to which the data for which a belonging class is unknown belongs is searched, and internal nodes the data pass through until reaching the lead node, the branching condition, and the probability table and the feature amount table of the leaf node are acquired as leaf node data. Also, in a score estimation device according to the exemplary embodiment, an importance degree storage unit for storing an importance degree of the leaf node may further provided, and in this case, as needed, the importance degree can be included in the leaf node data.

The importance degree can be used in order to further increase accuracy of an estimation score, the average value, the intermediate value, and the like of the reduction values of the entropy and the Gini coefficient, which are used to set individual branching conditions of internal nodes which data pass through until reaching the leaf node, can be used, and the reduction value from the leaf node to an arbitrary internal node back can be used.

[Probability Table Correcting Step]

In a probability table correcting step S5, in a probability table correction unit, the data for which a belonging class is unknown, the belonging leaf node data, and the data for recreation are input, and the probability table is corrected using the data for which a belonging class is known, the internal nodes passing though until reaching the leaf node, the branching condition, and the feature amount table.

For example, in a case in which the identification device is used as RandomForest, and an average value and a variance value of a dimension used as the branching condition of a parent of the leaf node is set to feature amount information, when the number of items of the learning data for recreation is set to N, the class is set to $(C_1, \ldots, \text{and } C_c)$, the number of items of the learning data for recreation of each class is set to $(N_1, \ldots, \text{and } N_c)$, data for which a class is unknown is set to $X$ $(X_1, \ldots, \text{and } X_M)$, a dimension used for the branching condition of the parent is set to D, a class inside the leaf node is set to $(C_1, C_3, \text{and } C_c)$, the number thereof is set to $(P_1, P_3, \text{and } P_c)$, an average value thereof is set to $(M_1, M_3, \text{and } M_c)$, a variance value thereof is set to $(V_1, V_3, \text{and } V_c)$, and a table combined of the probability table and the feature amount table is set to $\{(C_1, P_1, M_1, \text{and } V_1), (C_3, P_3, M_3, \text{and } V_3), \text{and } (C_c, P_c, M_c, \text{and } V_c)\}$, correction can be performed as follows. Also, in a case in which correction is not performed by a correction pattern 1, a correction pattern 2 is applied, and thus the correction pattern 1 and the correction pattern 2 may be used by being combined to each other.

(Correction Pattern 1 ): when a class in which the likelihood function P (X|C) is greatest, and a class including an average value where a distance $d_c$ of the data for which a class is unknown is shortest are same, the number of items of data of a class other than the class is set to zero.

$$P(X \mid C_1) = \frac{P_1}{N_1}, P(X \mid C_2) = \frac{P_2}{N_2}, P(X \mid C_c) = \frac{P_c}{N_c} \quad \text{[Expression 1]}$$

-continued $$d_1\sqrt{(X_D - M_1)^2}, d_2 = \sqrt{(X_D - M_2)^2}, d_c = \sqrt{(X_D - M_c)^2}$$

For example, in a case of $\mathrm{argmax}_{n\in\{1,2,c\}}(P(X|C_n))$ =$\mathrm{argmin}_{n\in\{1,2,c\}}(d_n)=\{1\}$, p1' is P1, P2' is zero, and Pc' is zero.

(Correction Pattern 2): a probability density $f_n$ of each class is calculated, the number of items of data of each class inside the leaf based on the calculated density is corrected, and thus the probability table is corrected.

$$f_1 = \frac{1}{\sqrt{2\pi V_1}}\exp\left(-\frac{(X_D - M_1)^2}{2V_1}\right)$$

$$f_2 = \frac{1}{\sqrt{2\pi V_2}}\exp\left(-\frac{(X_D - M_2)^2}{2V_2}\right)$$

$$f_c = \frac{1}{\sqrt{2\pi V_c}}\exp\left(-\frac{(X_D - M_c)^2}{2V_c}\right)$$

$$P_1' = \frac{f_1}{f_1 + f_2 + f_c}P_1, \; P_2' = \frac{f_2}{f_1 + f_2 + f_c}P_2, \; P_c' = \frac{f_c}{f_1 + f_2 + f_c}P_c$$

Otherwise, $P_1'$ may be $f_1 P_1$, $P_2'$ may be $f_2 P_2$, and $P_c'$ may be $f_c P_c$.

At the time of correcting the probability table, for example, an arbitrary threshold value is provided to a value of an importance degree of the leaf node, and an importance degree is used such as selecting the probability table to be corrected or multiplying the probability table by a value of the importance degree, and thus accuracy of the estimation score can be further improved.

[Estimation Score Calculating Step]

In the estimation score calculating step S6, the data for which a class is unknown, the corrected probability table, and the learning data for recreation are input, and an estimation score of each class is calculated based on a posterior probability of each class.

For example, when a total number of the entire learning data items is set to A, the number of items of the learning data of a class C is set to $A_c$, a total number of the learning data for recreation is set to N, the number of items of the learning data for recreation of the class C is set to $N_c$, a total number of data inside the probability table is set to P, and a value corresponding to the class C inside the probability table is set to $P_c$, the posterior probability of the class C with respect to data X for which a class is unknown can be defined as follows using a likelihood function.

$$P(C\mid X) = \frac{P(C)}{P(X)}P(X\mid C) = \frac{\frac{A_c}{A}}{\frac{P}{N}} * \frac{P_c}{N_c}$$ [Expression 3]

$$P(\overline{C}\mid X) = \frac{P(\overline{C})}{P(X)}P(X\mid \overline{C}) = \frac{\left(1 - \frac{A_c}{A}\right)}{\frac{P}{N}} * \frac{(P - P_c)}{(N - N_c)}$$

An estimation score $S_C$ may use the posterior probability $P(C|X)$ as it is, and may be defined as an expression to be described below.

$$S_C = \log\left(\frac{P(C\mid X)}{P(\overline{C}\mid X)}\right)$$ [Expression 4]

$$= \log P(C) + \log P(X\mid C) - \log(1 - P(C)) - \log P(X\mid \overline{C})$$

$$= \log\left(\frac{A_C}{A}\right) + \log\left(\frac{P_C}{N_c}\right) - \log\left(1 - \frac{A_C}{A}\right) - \log\left(\frac{(P - P_C)}{(N - N_c)}\right)$$

Also, a lower limit value may be provided to a value of $P(C|X)$ and $P(\overline{C}|X)$.

[Expression 2]

In a case in which the identification device is the RandomForest and is made up of T tree structure identification devices, the likelihood function is calculated from an average of the probability tables of the respective tree structure identification devices as in the following expression.

$$P(X) = \frac{1}{T}\sum_t \frac{P_t}{N_t}$$ [Expression 5]

$$P(X\mid C) = \frac{1}{T}\sum_t \frac{P_{t_C}}{N_{t_C} * P}$$

$$P(X\mid \overline{C}) = \frac{1}{T}\sum_t \frac{(P_t - P_{t_C})}{(N_t - N_{t_C}) * P_t}$$

In feature amounts, or the like in which data is extracted from an image, in a case in which M data items are extracted from one target, the data for which a class is unknown is set to $(X_1, \ldots, X_M)$, and the posterior probability of the class C with respect to data $X_i$ for which a class is unknown, can be defined by an expression as follows.

$$P(C\mid X_1, \ldots, X_M) = \frac{P(C)}{P(X_1, \ldots, X_M)}\prod_{i=1}^{M} P(X_i\mid C)$$ [Expression 6]

$$P(\overline{C}\mid X_1, \ldots, X_M) = \frac{1 - P(C)}{P(X_1, \ldots, X_M)}\prod_{i=1}^{M} P(X_i\mid \overline{C})$$

$P(X_i)$, $P(X_i|C)$, and $P(X_i|\overline{C})$ can be obtained in a same manner as that of a case in which one data item is extracted from one target.

As the estimation score $S_C$, the posterior probability $P(C|X_1, \ldots, X_M)$ may be used as it is, and may be defined by an expression as follows.

[Expression 7]

$$S_C = \log\left(\frac{P(C \mid X_1, \ldots, X_M)}{P(\overline{C} \mid X_1, \ldots, X_M)}\right)$$

$$= \log P(C) + \sum_{i=1}^{M} \log P(X_i \mid C) - \log(1 - P(C)) - \sum_{i=1}^{M} \log P(X_i \mid \overline{C})$$

[Estimation Result Outputting Step]

In an estimation result outputting step S7, in a class estimation unit, the data for which the belonging class is unknown and the estimation scores of the respective classes are input, a class of the data for which the class is unknown is output as an estimation result. Regarding class estimation, for example, a class of which the estimation score is highest may be an estimation result, and a class of which the estimation score is equal to or higher than a preset threshold value may be the estimation result, and if all scores are equal to or less than the threshold value, a result in which there is no class may be output.

Figure 3:
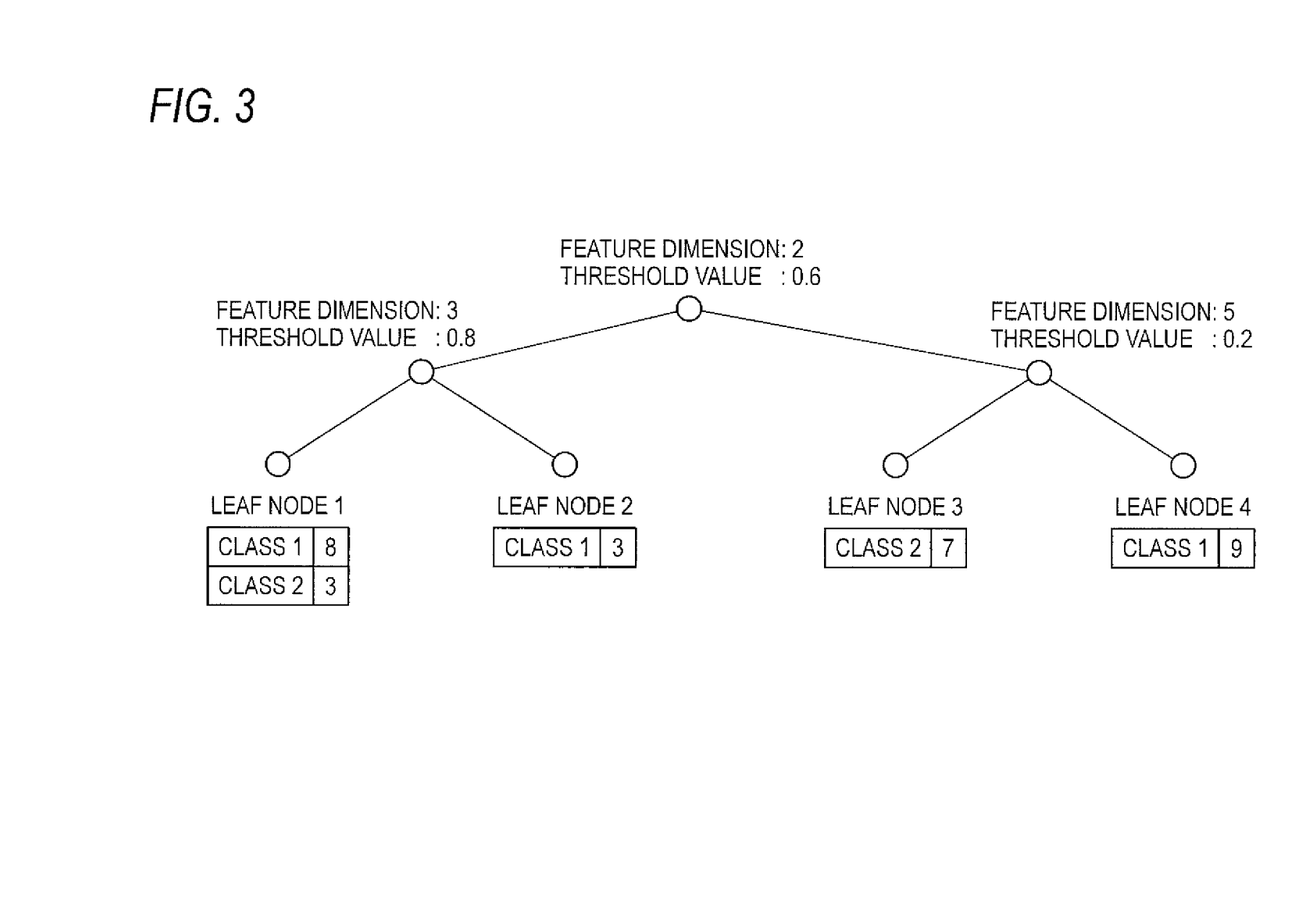
FIG. 3 is a conceptual diagram illustrating a tree structure identification device as previous learning data.

Next, regarding correction of the probability table, a specific example of a case in which data of 20 classes 1, data of 10 classes 2, and the tree structure identification device illustrated in FIG. 3 are used as the previous learning data, and data of 10 classes 3 is added thereto will be described.

Figure 4:
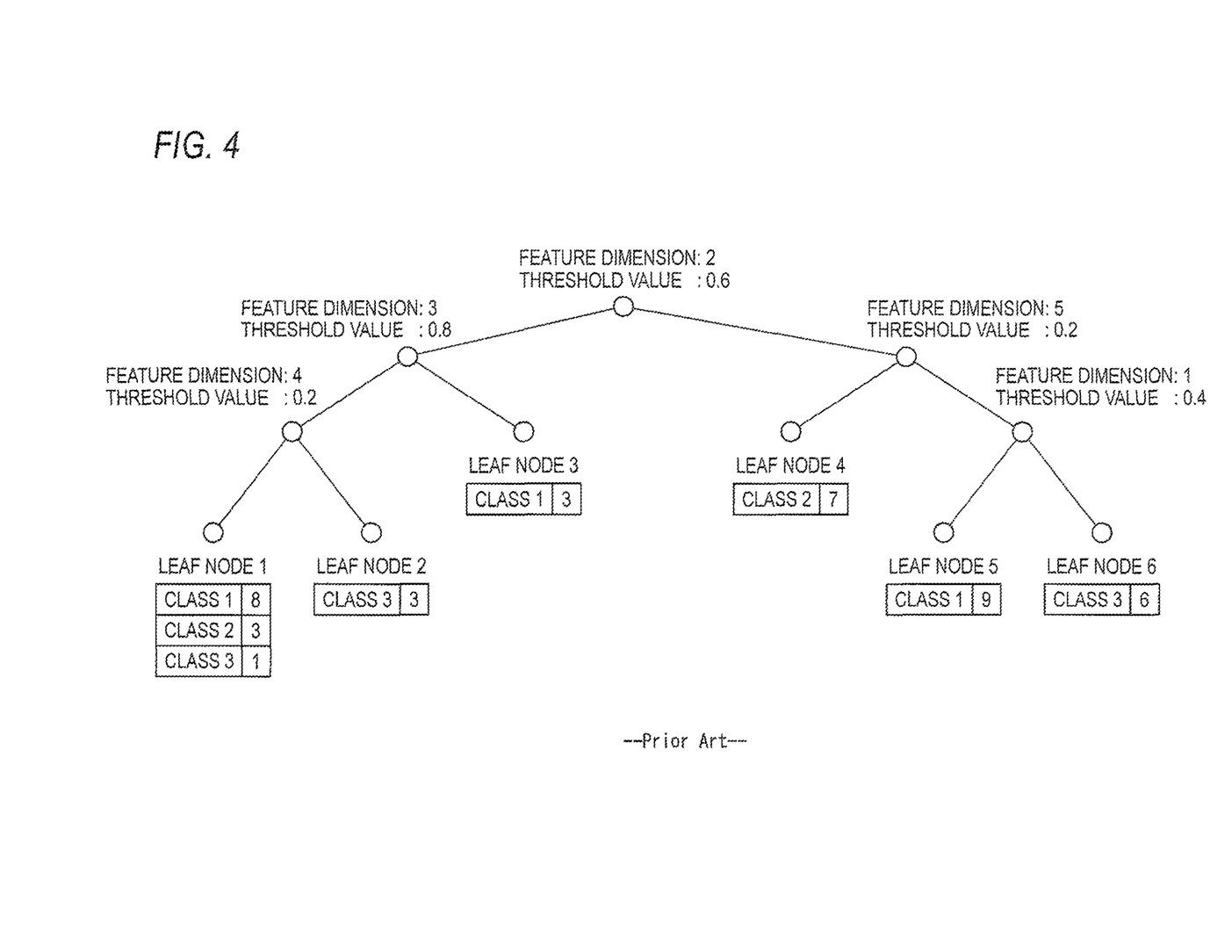
FIG. 4 is a conceptual diagram illustrating a tree structure identification device recreated using a method of the related art.

First, in a case of using IGT (Incrementally Grow Tree) of a method of the related art, the tree structure identification device after being recreated by adding the class 3 becomes, for example, that as illustrated in FIG. 4. Here, in the leaf node 1 and the leaf node 4 in the tree structure identification device of the previous learning data, the branching condition is newly added so as to form internal nodes, and recreated as the identification device including total six leaf nodes.

Figure 5:
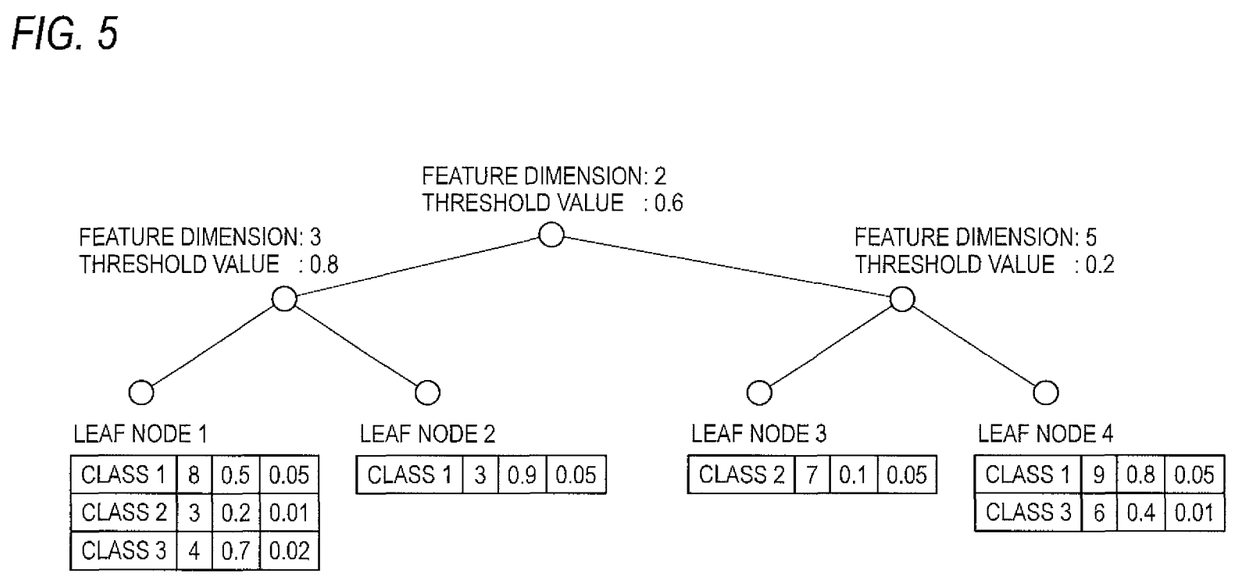
FIG. 5 is a conceptual diagram illustrating the tree structure identification device created by the class estimation apparatus illustrating according to the exemplary embodiment.

Next, the tree structure identification device after being recreated by the exemplary embodiment is illustrated in FIG. 5. Also, FIG. 5 illustrates an example in which the probability table and the feature amount table are combined. In the exemplary embodiment, the feature amount table is stored in each leaf node, but the branching condition is not newly added thereto, and thus a structure of the tree structure identification device is the same as that of FIG. 3, that is, a structure of the tree structure identification device of the previous learning data.

Here, a case in which class estimation is carried out on data of a five-dimensional vector X (0.5, 0.7, 0.4, 0.5, and 0.3) as the data for which a belonging class is unknown, will be described as follows.

(Case of Using IGT of Method of Related Art)

The tree structure identification device, which is a device illustrated in FIG. 4, starts from the root node, and traces to the right child node because a second dimension of feature dimension is 0.7 (that is, greater than 0.6, which is threshold value) in a branch of the root node. In a next branch, since a fifth dimension of the feature dimension is 0.3 (>0.2) and passes through a root so called right child node, and a first dimension of the feature dimension is 0.5 (>0.4), finally, it is determined to be belong to the leaf node 6 including the probability table so called {(classes 3 and 6 )}.

(Case of Using Class Estimation Apparatus According to Exemplary Embodiment)

The tree structure identification device is illustrated in FIG. 5, and it starts from the root node, and since the second dimension of the feature dimension is 0.7 (>0.6), and passes through the right child node, and a fifth dimension of the feature dimension is 0.3 (>0.2), first, it is determined to be belong to the leaf node 4.

The leaf node 4 includes the probability table so called {(classes 1 and 9 ), (classes 3 and 6 )}, and then the probability table is corrected.

Here, since the likelihood function is P(X|class 1 )=9/20, P(X|class 3 )=6/10, a class in which the likelihood function is the greatest becomes the "class 3".

In addition, since the feature dimension selected as the branching condition in the parent node is the fifth dimension, when a distance between a fifth dimension of the data X and an average value of the feature amount table of the leaf node is calculated, a square root of d class 1 =(0.3-0.8)² is 0.5, and a square root of d class 3 =(0.3-0.4)² is 0.1. Accordingly, a class in which the distance is the shortest becomes the "class 3".

Since the number of items of data of the class 1 is corrected to be zero by applying the correction pattern 1, and the probability table of the leaf node 4 after being corrected becomes {(classes 1 and 0 ), (classes 3 and 6 )}, the class 1 in which the number of items of data becomes zero is removed, and the probability table of the leaf node 4 are finally corrected to be {(classes 3 and 6 )}. As described above, in the present data X, using a method according to the exemplary embodiment, without adding the branching condition of a tree structure, estimation is performed using the probability table like the IGT of the method of related art.

EXAMPLE

[Comparison of Time Required for Recreating Identification Device]

Evaluation by comparing time and estimation accuracy of the identification device and those of a method of the related art is performed. Using VOC 2007 which is used a lot in a benchmark of image recognition, with respect to data of 10 classes (image for learning: 5011 sheets) and the Random-Forests created from the data, by adding 10 classes (image for evaluating: 4952 sheets), time required for recreating the identification device is measured and the estimation accuracy is evaluated, and thus a mean average precision (MAP) value (the average value of the averages of precisions at individual recalling ratio levels (every 0.1 level in a range of 0.1 to 1.0) in all classes) in a case in which the obtained identification device was used is calculated.

As the Example, when RandomForests created in the 10 classes is used as it is, and the probability table and the feature amount table in the entire learning data are updated, recreating the identification device and newly recreating RandomForests as 20 labels are compared as a comparative example 1. Regarding the MAP value, in the score estimation device according to the exemplary embodiment, a case in which the probability table is not corrected (corresponding to ULS (Update Leaf Statics) which is a method of the related art) is set to a comparative example 2. Comparison of the MAP value is illustrated in Table 3, and recreating time of the identification device is illustrated in Table 4.

TABLE 3

| | MAP value (entirety) | MAP Value (adding of 10 classes) |
|---|---|---|
| Example | 72.5 | 71.0 |
| Comparative Example 1 | 73.2 | 71.7 |
| Comparative Example 2 | 71.1 | 68.1 |

TABLE 4

| | Recreating Time (second) |
|---|---|
| Example | 51 |
| Comparative Example 1 | 73,348 |

In the class estimation apparatus of the exemplary embodiment, the estimation accuracy can be improved to be greater than that in ULS as seen from Table 3.

In addition, as illustrated in Table 4, compared to a case in which the identification device is created with new time required for recreating the identification device, it is known that the time largely decreased. Since new branching condition is not created in the class estimation apparatus of the exemplary embodiment, time required for recreating the identification device is substantially same as ULS which is a method of the related art.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program causing a computer to execute:
   a data reception step of receiving an input of image data including feature amounts;
   an identification device reception step of receiving an input of an identification device having a tree structure;
   a table storage step of storing a probability table and a feature amount table in a leaf node of the tree structure;
   a probability table correcting step of correcting the probability table; wherein,
   when input image data for which a belonging class is unknown is input to the computer, the computer searches a leaf node to which the input image data belongs; and
   corrects the probability table of the leaf node to which the input image data belongs,
   wherein, when a class in which likelihood calculated from a value of the probability table is greatest and a class in which a distance calculated from a feature amount of the input image data and a value of the feature amount table is shortest are same, the computer sets the number of data of the classes except for the class in which the likelihood is greatest and the distance is shortest to zero;
   a class estimation step of estimating a class of the input image data using the probability table corrected in the probability table correcting step; and
   an output step of outputting an estimation result based on the class estimating step.

2. A class estimation method executed by a computer, comprising:
   receiving an input of image data including feature amounts;
   receiving an input of an identification device having a tree structure;
   storing a probability table and a feature amount table in a leaf node of the tree structure;
   correcting the probability table, wherein,
   when input image data for which a belonging class is unknown is input to the computer, the computer searches a leaf node to which the input image data belongs; and
   corrects the probability table of the leaf node to which the input image data belongs, wherein, when a class in which likelihood calculated from a value of the probability table is greatest and a class in which a distance calculated from a feature amount of the input image data and a value of the feature amount table is shortest are same, the computer sets the number of data of the classes except for the class in which the likelihood is greatest and the distance is shortest to zero;
   estimating a class of the input image data using the probability table corrected in the probability table correcting step; and
   outputting an estimation result based on the estimating step.

3. The non-transitory computer readable medium according to claim 1, wherein the computer further executes: storing an importance degree in the leaf node of the tree structure.

4. The class estimation method according to claim 2, wherein the computer further executes: storing an importance degree in the leaf node of the tree structure.

* * * * *